United States Patent

Nose

[11] Patent Number: 5,926,342
[45] Date of Patent: Jul. 20, 1999

[54] AIR DYNAMIC PRESSURE BEARING APPARATUS AND DATA DRIVE APPARATUS USING THE SAME

[75] Inventor: Tamotsu Nose, Nagano, Japan

[73] Assignee: Sankyo Seiki Mfg. Co., Ltd., Nagano-ken, Japan

[21] Appl. No.: 08/904,946
[22] Filed: Aug. 1, 1997
[51] Int. Cl.⁶ .................................................. G11B 17/08
[52] U.S. Cl. .................................... 360/98.07; 360/99.08; 360/99.11; 384/107; 384/113
[58] Field of Search ...................................... 384/107–113; 360/98.07, 99.08, 99.11

[56] References Cited

U.S. PATENT DOCUMENTS

| | | | |
|---|---|---|---|
| 5,120,139 | 6/1992 | Asada et al. | 384/107 |
| 5,289,067 | 2/1994 | Tanaka et al. | 310/90.5 |
| 5,357,163 | 10/1994 | Minakuchi et al. | 310/90 |
| 5,504,637 | 4/1996 | Asada et al. | 360/98.07 |
| 5,536,088 | 7/1996 | Cheever et al. | 384/107 |
| 5,559,651 | 9/1996 | Grantz et al. | 360/99.08 |
| 5,659,445 | 8/1997 | Yoshida et al. | 360/98.07 |
| 5,678,929 | 10/1997 | Parsoneault et al. | 384/112 |
| 5,738,446 | 4/1998 | Ghosh et al. | 384/112 |
| 5,743,655 | 4/1998 | Slavin et al. | 384/107 |
| 5,760,509 | 6/1998 | Chong | 310/90 |

*Primary Examiner*—Jefferson Evans
*Attorney, Agent, or Firm*—McAulay Nissen Goldberg Kiel & Hand, LLP

[57] ABSTRACT

In a dynamic pressure bearing apparatus having a fixed shaft, dynamic pressure generating grooves formed at least on one side of circularly facing surfaces of a rotor and of the fixed shaft which is rotatably meshed with the rotor, a radial bearing formed in an axial direction and a thrust bearing is formed by one end of the fixed shaft and axially facing surfaces of the rotor, the rotor is rotatably supported against the fixed shaft by air dynamic pressure which is generated in the radial bearing and the thrust bearing. The radial dynamic pressure bearing generating grooves are formed on the radial bearing in a dynamic pressure groove shape which pumps air pressure toward the thrust bearing side. An air guide hole is formed in the fixed shaft from the one end to another end of the fixed shaft. The dynamic pressure bearing apparatus comprises the thrust bearing, a pressure chamber, which stores air pumped from the radial bearing between the one end of the fixed shaft and the surface of the rotor facing the one end in the axial direction and a pressure adjuster constructed with small air passages from the pressure chamber and the air guide hole.

5 Claims, 5 Drawing Sheets

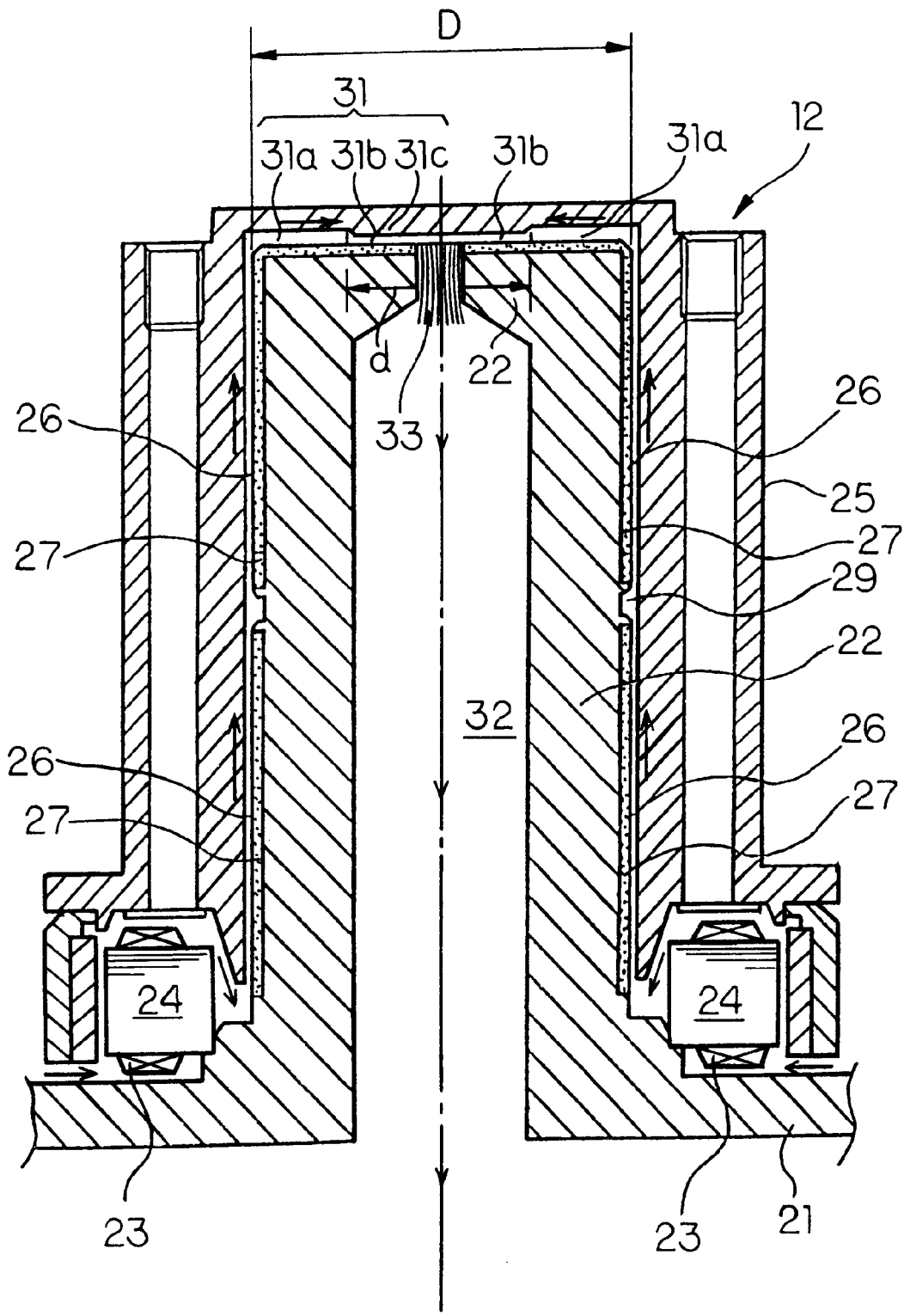
F I G. 1

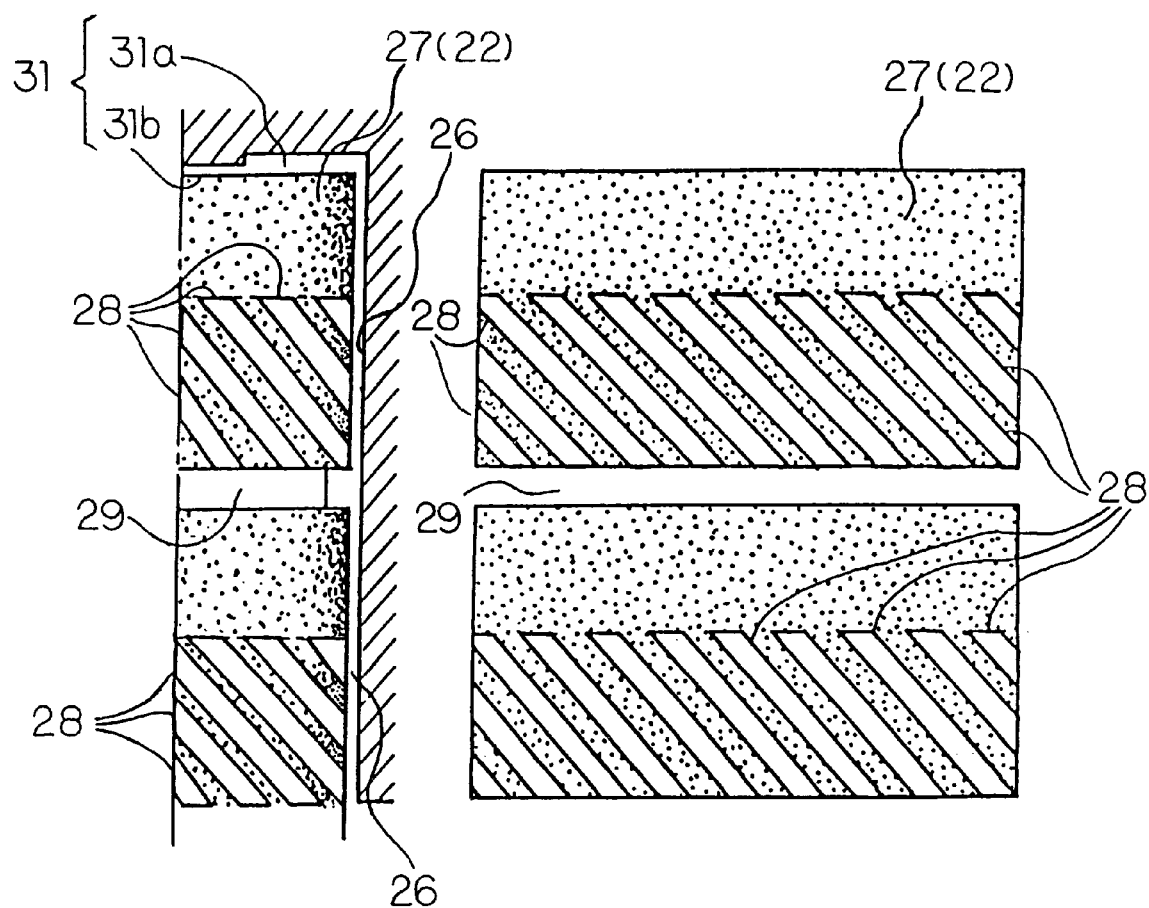
F I G. 2A      F I G. 2B

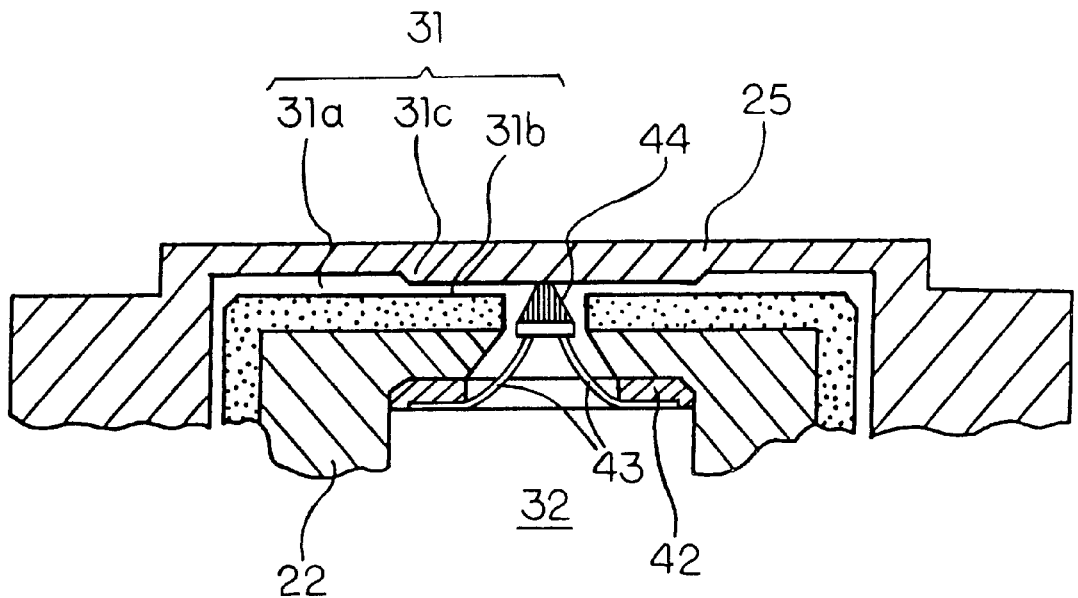
F I G. 4
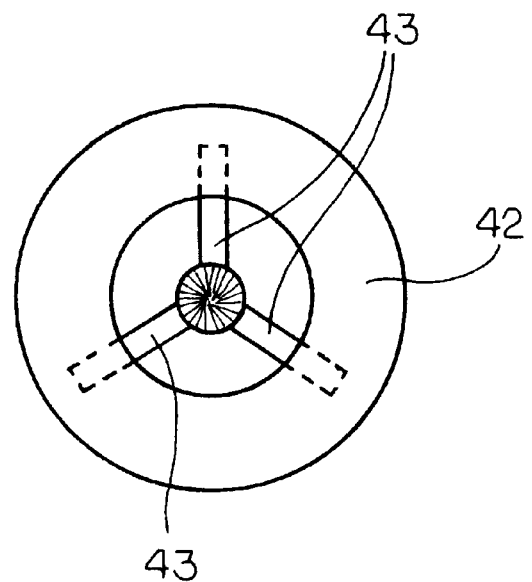
F I G. 5

5,926,342

AIR DYNAMIC PRESSURE BEARING APPARATUS AND DATA DRIVE APPARATUS USING THE SAME

BACKGROUND OF THE INVENTION a) Field of the Invention

The present invention relates to a dynamic pressure bearing apparatus in which air dynamic pressure is generated in a radial bearing and a thrust bearing to support a shaft both in the radial and thrust directions. The present invention also relates to a data disk drive apparatus which employs the dynamic bearing apparatus.

b) Description of the Related Art

Recently, in the area of drive apparatus such as motors, various types of dynamic pressure bearing apparatus have been studied and proposed. In a dynamic pressure bearing apparatus of conventional technology, a radial bearing comprises a rotor, which is rotatably meshed with a fixed shaft, for example, and radial dynamic pressure generating grooves, which are formed on the circumference of said fixed shaft. Also, thrust bearings are constructed by an edge of the fixed shaft and the surface of the rotor which faces in the axial direction. The rotor is rotatably supported by the air dynamic pressure which is generated in the radial bearing and the thrust bearing.

The bearing apparatus using the air, however, has a viscosity of one thousandth compared to the bearing dynamic pressure using oil. As a result, the bearing apparatus of conventional technology are generally big and therefore likely to increase the size of the entire apparatus. They can provide excellent air dynamic pressure only at a high speed. Specifically, they are poor in the shaft support properly in the thrust direction and in controlling vibrations. For this reason, a compact hard disk drive (HDD) system has been demanded for many years. It is commonly believed that a low speed bearing apparatus cannot employ the air dynamic pressure. In addition, an air dynamic pressure bearing apparatus can catch more or less dust particularly when the bearing apparatus abrades when it starts moving or stops. The dust can be harmful to the apparatus such as a hard disk drive (HDD) system and the like in which cleanliness is critical.

Nonetheless, in the air dynamic pressure apparatus, a rotor is rotated in air creating an insulated state. If the air dynamic pressure bearing apparatus is used, for example, in a hard disk drive (HDD) system, static electricity generated on a data disk is likely to be accumulated on the rotor side. The accumulated static electricity may damage the MR (magnetic resister) type head.

OBJECTS AND SUMMARY OF THE INVENTION

Therefore, a first object of the present invention is to provide a compact dynamic pressure bearing apparatus which can provide the thrust and radial dynamic pressures at relatively low speed while demonstrating excellent shaft supporting properties and vibration control functions.

In addition to the first object, a second object of the present invention is to provide a clean air dynamic pressure bearing apparatus and a data disk drive apparatus which employs the same bearing apparatus.

In addition to the first and second objects, a third object of the present invention is to provide an air dynamic pressure bearing with static dissipative capability and to provide a data disk drive apparatus which employs the same bearing apparatus.

In accordance with the invention, in a dynamic pressure bearing apparatus having a fixed shaft, dynamic pressure generating grooves formed at least on one side of circularly facing surfaces of a rotor and of the fixed shaft which is rotatably meshed with the rotor, a radial bearing formed in an axial direction and a thrust bearing is formed by one end of the fixed shaft and axially facing surfaces of the rotor, the rotor is rotatably supported against the fixed shaft by air dynamic pressure which is generated in the radial bearing and the thrust bearing. The radial dynamic pressure bearing generating grooves are formed on the radial bearing in a dynamic pressure groove shape which pumps air pressure toward the thrust bearing side. An air guide hole is formed in the fixed shaft from the one end to another end of the fixed shaft. The dynamic pressure bearing apparatus comprises the thrust bearing, a pressure chamber, which stores air pumped from the radial bearing between the one end of the fixed shaft and the surface of the rotor facing the one end in the axial direction and a pressure adjuster constructed with small air passages from the pressure chamber and the air guide hole.

BRIEF DESCRIPTION OF THE DRAWINGS

In the drawings:

FIG. 1 is a descriptive diagram showing a cross section of an HDD spindle motor using the dynamic pressure bearing apparatus of a first embodiment of the present invention;

FIGS. 2(a) and 2(b) is a magnified diagram showing a radial bearing formed in the dynamic pressure bearing apparatus of the HDD spindle motor shown in FIG. 1; FIG. 2(a) is a cross sectional diagram; FIG. 2(b) is a cross sectional diagram;

FIG. 4 is a partial cross section showing another alternate embodiment of the static dissipative member;

FIG. 5 is a plan diagram showing the static dissipative member of FIG. 4;

DESCRIPTION OF THE PREFERRED EMBODIMENTS

The preferable modes of embodiment of the present invention relate to a data disk drive apparatus which employs an HDD spindle motor of the fixed shaft type.

The overall structure of the data disk drive apparatus is described herein.

Figure 7:
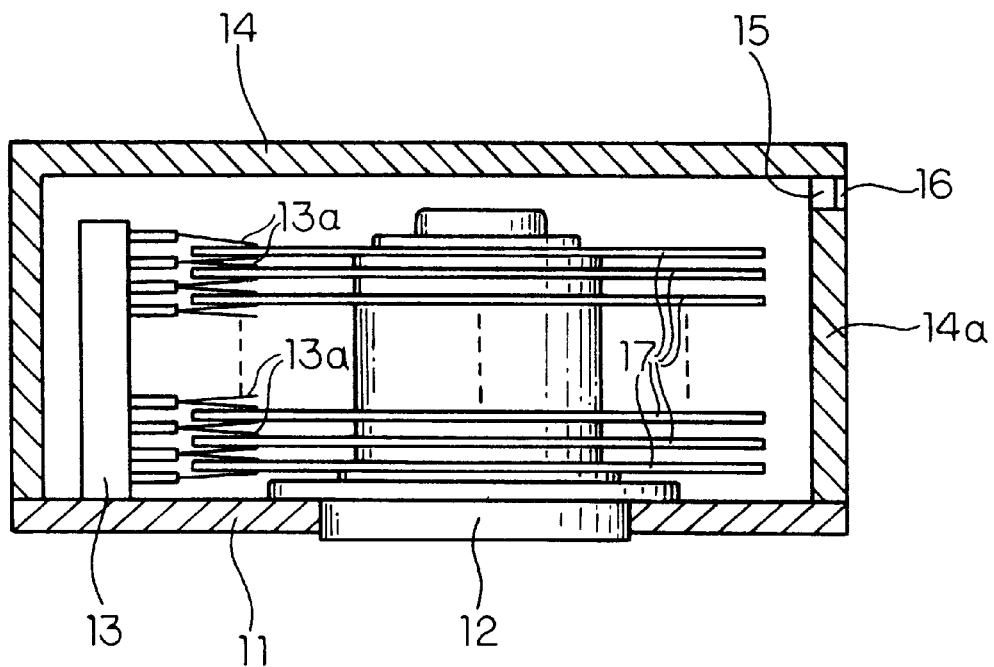
FIG. 7 is a cross sectional diagram showing an over all structure of the data disk apparatus of the present invention.

HDD spindle motor 12 and carrier 13 are sealed by cover case 14 which is fixed onto the base plate 11, as shown in FIG. 7. The cover case isolates the apparatus from external air to maintain a clean state therein. Also, cover case 14 is fed with air from the external environment through filter 16 which is attached onto ventilation hole 15 on the side wall 14a of cover case 14. Cover case 14 exhausts air to the external environment through inside HDD spindle motor 12.

A plurality of hard disks 17 are attached stacked on the HDD spindle motor 12 at a given distance from each other in the shaft direction. Also the heads, the end of a plurality of arms 13a extending from carrier 13 contact the front and back of hard disks 17 to hold them up.

HDD spindle motor 12 also employs a bearing apparatus using air dynamic pressure. The structures of the HDD spindle motor 12 and the air dynamic pressure bearing apparatus are described herein.

As shown in FIG. 1, the HDD spindle motor 12 comprises a stator assembly, which is built into the side of motor frame 21 made of aluminum and a rotor assembly, which is built on the stator assembly in the shaft direction. The motor frame 21 of the stator assembly is fixed onto base plate 11 (FIG. 7) in the data disk drive apparatus.

Fixed shaft 22 stands vertically integral with the motor frame 21 at the center of motor frame 21. At the periphery of the lower end (lower portion in the figure) of the boss on fixed shaft 22, are stator cores 24 having salient poles wound with a coil 23.

Hub 25, the rotor, is rotatably fixed on the periphery of fixed shaft 22. Hub 25 is formed as a hollow cylinder in a cup shape. A pair of radial bearings 26, 26 are installed in the space between the inner wall of hub 25 and outer wall of fixed shaft 22. A pair of radial bearings 26, 26 are arranged parallel in the axial direction for pumping air to obtain a given air pressure through the radial dynamic pressure generating grooves formed on the outer wall of fixed shaft 22. The radial bearings 26, 26 support the shaft in the radial direction by the air pressure.

Hub 25 and fixed shaft 22, in this embodiment, are made of aluminum of the same type, which can reduce the possible fluctuation of the bearing gap even if the temperature environment is changed.

Fixed shaft 22 has radial dynamic pressure generating grooves on the peripheral wall. Upper fixed shaft 22, as illustrated, may contact the side of hub 25 at the edge of the peripheral wall when the motor starts or stops and the like. These portions are coated with coating layer 27 of a lubricant resin and the like containing polyamide imide, which prevents the fixed shaft 22 from unwanted abrasion or burning.

Radial dynamic pressure generating grooves 28, 28, as shown in FIG. 2, are formed on coating layer 27 of fixed shaft 22. Each of these radial dynamic pressure generating grooves 28 are shaped as a dynamic pressure groove, which extends at a given angle. When the hub 25 side moves from right to left in the figure, air is pumped toward the thrust shaft side (upper side in the figure) as described later. Both radial dynamic pressure generating grooves 28, 28 are divided by division groove 29 in the middle of fixed shaft 22 in the shaft direction.

Thrust bearing 31 is formed on top (upper end in the figure) of fixed shaft 22. Thrust bearing 31 is installed between the upper edge of fixed shaft 22 and the of hub 25 which faces the upper edge in the axial direction, which is the rotor described before. In this way, hub 25 is pushed up in the shaft direction with air dynamic pressure generated in the thrust bearing 31 to support the shaft in the thrust direction. The detailed structure of thrust bearing 31 will be described later.

Air guiding hole 32 on fixed shaft 22 goes outside of the shaft along the center axial line of fixed shaft 22. Air guiding hole 32 has an opening, on the upper side of a motor in the figure. Air guiding hole 32 also has an opening, at the lower side in the figure, facing toward the external environment of the above mentioned data disk apparatus. The upper portion of air guiding hole 32 in the figure has a smaller diameter than the lower portion. The opening facing toward thrust bearing 31 also has a small diameter.

Next, the structure of the above thrust bearing 31 will be described.

Thrust bearing 31 is formed by the edge of fixed shaft 22, as shown at the top of the figure, and the surfaces of hub 25 facing the edge in the axial direction. Thrust bearing 31 comprises pressure chamber 31a, which are made up of air passages partitioned by the facing surfaces of hub 25 and the upper shaft edge, and pressure adjuster 31b. Pressure chamber 31a are circularly arranged around the outer circle of the shaft edge of fixed axis 22. A pressure adjuster is arranged around the inner circle of pressure chamber 31a.

Pressure chamber 31a communicates with the above mentioned radial bearings at the outer circle portion of pressure chamber 31a. Air pumped in by the aforementioned radial dynamic pressure generating grooves 28 pressurizes chambers 31a to provide a given thrust pushing force. Pressure chamber 31a and pressure adjuster 31b have a diameter d set to ¼ to ⅔ of the outer diameter D of fixed shaft 22 at the border.

Pressure adjuster 31b are made of small air passages which originates from the inner circle portion of pressure chamber 31a to reach the upper end opening of air guide hole 32. Small air passages regulate the air flow, thus adjusting the air pressure in pressure chamber 31a appropriately. Small air passages, which constitute pressure adjuster 31b, are partitioned by step 31c formed on the hub 25 side and the edge of fixed shaft 22 facing toward step 31 in the axial direction. Step 31c is created by projecting the center of hub 25 toward shaft 22 side (the lower side in the figure). Air chamber 31a communicates with air guiding hole 32 side via pressure adjuster 31b partitioned by step 31c.

A static dissipative member 33, which is made up with conductive yarn members 33, hangs in the air guiding hole 32 which is at the center of the step 31c of the hub 25 side which constitute a pressure adjuster 31b. Static dissipative member 33 has a movable portion (the lower end in the figure), which contacts the inner wall of the air guiding hole 32. The hub 25 side is conducted to fixed shaft 22 side with static dissipative member 33.

In the apparatus used in the embodiment, hub 25, the rotor, is supported at its shaft in the radial direction at a high pressure fed through radial dynamic pressure generating grooves 28, 28 of radial bearings 26, 26. Hub 25 is supported at its end in the thrust direction by a high pressure of fluid fed to pressure chamber 31a, which constitutes thrust bearing 31. A high pressure is pumped up through radial dynamic pressure generating grooves 28, 28 in radical bearings 26, 26.

Air guiding hole 32 of fixed shaft 22 is fed with a high pressure from pressure chamber 31a through the pressure adjuster 31b. Pressure adjuster 31b brake the air flow therein according to the total of the weight of hub 25 and that of disks attached on the hub 25. As a result, pressure chamber 31a automatically adjusts its air pressure, which constitutes thrust bearing 31, to maintain an appropriate pressure according to the total weigh of the rotor.

In this shaft support mechanism, a shaft can be supported with little bearing loss. Pressure chamber 31a of thrust bearing 31 can also function as a damper with respect to the moving force in the shaft direction. This structure prevents fluctuation in force in the axial direction which may be caused by vibrations and the like to stabilize rotation.

If pressure adjuster 31b are formed by narrowing the air passage with step 31c, as shown in this embodiment, its configuration can be simple.

If diameter d at the border between pressure chamber 31a and pressure adjuster 31b is set to ¼ to ⅔ of outer diameter D of fixed shaft 22, as demonstrated in this example, excellent thrust support can be obtained.

Also, as in this embodiment, if pressure adjuster 31b is formed between pressure chamber 31a and air guiding hole 32 and the surface of the small air passage in pressure adjuster 31b is formed on the plane orthogonal to or which crosses the surfaces which form radial bearings 26, 26 arranged opposite each other. If pressure adjuster 31b is arranged at the center between fixed shaft 22 and hub 25, pressure adjuster 31b can effectively regulate the air flow within a small space.

In the apparatus used in this embodiment air in cover case 14 of a data disk drive apparatus is exhausted into the external environment through air guiding hole 32 of the dynamic pressure bearing apparatus in the HDD spindle motor 12. As a result, dust generated in a data disk drive apparatus are exhausted to the external environment through air guiding hole 32 of the dynamic pressure bearing apparatus. This maintains the data disk drive apparatus in a clean state.

Also, in the apparatus used in this embodiment, hub 25, the rotor, is conducted to fixed shaft 22 side via static dissipative member 33. Static electricity accumulated on the hub 25 side can be dissipated through the fixed shaft 22 side. This is especially effective when using an MR (magnetic resistor type) head, preventing the head from electrostatic damage and the like.

If static dissipative member 33 is arranged at the center of air guiding hole 32 as the center of the rotation rotates at a slow speed, static dissipative member 33 contacts data disks at a low speed, generating minimum dust. Even if dust is generated, it can be exhausted to the outside through air guiding hole 32, thus maintaining the data disk drive apparatus clean.

Figure 3:
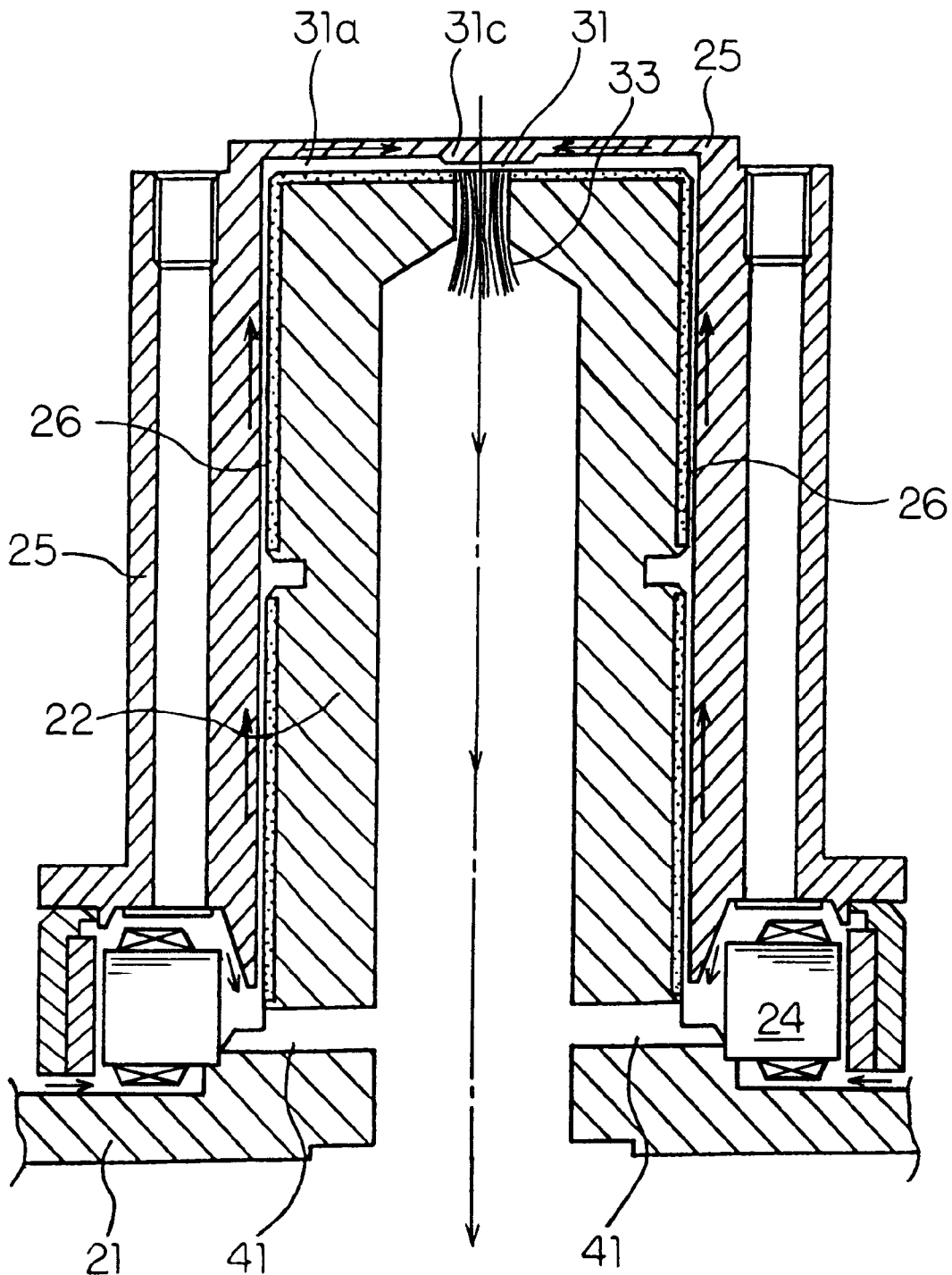
FIG. 3 is a cross sectional diagram showing the HDD spindle motor using the dynamic pressure bearing apparatus of an alternate embodiment of the present invention.

In the apparatus shown in FIG. 3, the same components are indicated with the same codes. Air circulation passage 41 facing toward the stator side is punched through radially near the exit to the outside of air guiding hole 32, at the bottom in the figure. A part of the air flowing through air guiding hole 32 is exhausted to inside stator core 24 through air circulation passage 41. A system with this air circulation mechanism can provide the same advantageous effect.

Embodiments of the present invention have been described specifically. The present invention is not limited to the above embodiments. A variety of modifications can be made as far as the spirit of the present invention is maintained. For example, step 31c, which constitutes pressure adjuster 31b is not limited to the one formed on the hub 25 side, which is the rotor side, as described in the above embodiment. Step 31c can be formed on the fixed shaft 22 side or on both the rotor and shaft sides.

Also, static dissipative member 33 used in the present invention is not limited to the above mentioned thread member. A conductive brush may be used. In this case, as shown in FIGS. 4 and 5, for example, conductive brush 43 may be supported by circular frame 42, which is attached inside the air guiding hole 32 of the fixed shaft, such that it projects on the hub 25 side and a part of conductive brush 43 contacts the hub 25 side.

Figure 6:
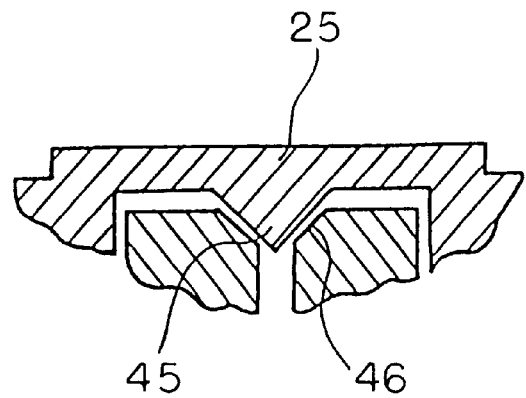
FIG. 6 is a cross sectional diagram showing another alternate embodiment of the pressure adjuster in a thrust bearing.

Further, the step, which constitutes the pressure adjuster may be formed with a conic step 45, as shown in FIG. 6. Pressure adjuster 46 may be formed with small air passages sloped at an angle. In this embodiment, pressure adjuster 46 can regulate air flow in an even smaller space.

The dynamic pressure bearing apparatus of the present invention can be applied to the dynamic pressure bearing apparatus which is used for other than a HDD motor.

As described, in the air dynamic pressure bearing apparatus of the present invention, radial dynamic pressure generating grooves on a radial bearing, which supports a rotor in the axial direction, is constructed with a group of dynamic pressure grooves, which pumps up the air to a pressure chamber in the thrust bearing. The radial bearing pumps up air pressurized in pressure chamber of the thrust bearing to push up the rotor in the shaft direction. Also, a pressure adjuster automatically adjusts the force to support the thrust shaft with its regulating mechanism of the flow from the pressure chamber of the thrust bearing to the air guiding hole in the fixed shaft. Further, the pressure chamber functions as a damper, thus reducing vibrations thereon. This configuration provides a compact, easy-to-handle apparatus of excellent shaft support property which can maintain a sufficient thrust dynamic pressure at a low speed. The apparatus is also applicable to any air dynamic pressure bearing apparatus used in various systems such as a hard disk drive (HDD) system.

While the foregoing description and drawings represent the preferred embodiments of the present invention, it will be obvious to those skilled in the art that various changes and modifications may be made therein without departing from the true spirit and scope of the present invention.

What is claimed is:

1. In a dynamic pressure bearing apparatus having:
   a fixed shaft,
   dynamic pressure generating grooves formed at least on one side of circularly facing surfaces of a rotor and of said fixed shaft which is rotatably meshed with said rotor,
   a radial bearing formed in an axial direction, and
   a thrust bearing formed by one end of said fixed shaft and axially facing surfaces of said rotor;
   said rotor being rotatably supported against said fixed shaft by air dynamic pressure which is generated in said radial bearing and said thrust bearing, wherein said radial dynamic pressure generating grooves are formed on said radial bearing in a dynamic pressure groove shape, which pumps air pressure toward the thrust bearing side;
   an air guide hole being formed in said fixed shaft from said one end to the other end of said fixed shaft;
   said dynamic pressure bearing apparatus further comprising:
   said thrust bearing;
   a pressure chamber, which stores air pumped from said radial bearing, between said one end of said fixed shaft and the surface of said rotor facing said one end in the axial direction, and
   a pressure adjuster constructed with small air passages from said pressure chamber and said air guide hole; wherein said pressure chamber is arranged circularly around the circumference of one end of said fixed shaft, and a diameter at a border between said pressure chamber and said pressure adjuster is set about ¼ to about ⅔ of an outer diameter of said fixed shaft.

2. The dynamic pressure bearing apparatus in which said pressure adjuster as set forth in claim 1 includes a step projecting in the axial direction, which is one of said one end of fixed shaft and the surface facing said one end of fixed shaft in the axial direction; and wherein said step makes said air passages which exist from said air pressure chamber to the opening of said air guide hole.

3. A dynamic pressure bearing apparatus in which said pressure adjuster as set forth in claim 1 is formed between said air chamber and said air guide hole; and the surface on which said small air passages are formed in said pressure adjuster is placed orthogonal with the facing surface formed on said radial bearing.

4. A data drive apparatus which employs a dynamic bearing apparatus comprising:

a fixed shaft, dynamic pressure generating grooves formed at least on one side of circularly facing surfaces of a rotor and of said fixed shaft which is rotatably meshed with said rotor, a radial bearing formed in an axial direction, and a thrust bearing formed by one end of said fixed shaft and axiall facing surfaces of said rotor;

said rotor being rotatably supported against said fixed shaft by air dynamic pressure which is generated in said radial bearing and said thrust bearing, wherein said radial dynamic pressure generating grooves are formed on said radial bearing in a dynamic pressure groove shape, which pumps air pressure toward the thrust bearing side;

an air guide hole being formed in said fixed shaft from said one end to the other end of said fixed shaft;

said dynamic pressure bearing apparatus comprising:

said thrust bearing;

a pressure chamber, which stores air pumped from said radial bearing, between said one end of said fixed shaft and the surface of said rotor facing said one end in the axial direction, and a pressure adjuster constructed with small air passages from said pressure chamber and said air guide hole;

a motor stator on the fixed shaft side and a rotor placed on the rotor side; and a motor frame, which projects integral with the fixed shaft side of said stator, being fixed onto said apparatus such that the entire motor is isolated from the outer environment and being driven with a data disk secured on said rotor;

said air guide hole formed in said dynamic pressure apparatus being opened on the side of the external environment in said apparatus.

5. The data disk drive apparatus as set forth in claim 4 in which a static dissipation member, which electrically conducts on said fixed shaft side is provided;

said static dissipation member being located at the center of said fixed shaft and said rotor.

* * * * *